United States Patent
Qiao et al.

(10) Patent No.: US 10,996,529 B2
(45) Date of Patent: May 4, 2021

(54) ARRAY SUBSTRATE, LIQUID CRYSTAL DISPLAY PANEL AND DRIVING METHOD THEREOF THAT PREVENT LIQUID CRYSTAL MOLECULES FROM UNDERGOING A POLARIZATION PHENOMENON AND HAVE LOW POWER CONSUMPTION

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yun Qiao, Beijing (CN); Zhen Wang, Beijing (CN); Wei Wang, Beijing (CN); Fei Huang, Beijing (CN); Han Zhang, Beijing (CN); Peng Liu, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/634,701

(22) PCT Filed: Dec. 12, 2018

(86) PCT No.: PCT/CN2018/120612
§ 371 (c)(1),
(2) Date: Jan. 28, 2020

(87) PCT Pub. No.: WO2019/134486
PCT Pub. Date: Jul. 11, 2019

(65) Prior Publication Data
US 2020/0201130 A1   Jun. 25, 2020

(30) Foreign Application Priority Data

Jan. 5, 2018   (CN) .......................... 201810010209.4

(51) Int. Cl.
*G02F 1/1362* (2006.01)
*G02F 1/1345* (2006.01)
(Continued)

(52) U.S. Cl.
CPC ...... *G02F 1/136286* (2013.01); *G02F 1/1368* (2013.01); *G02F 1/13452* (2013.01);
(Continued)

(58) Field of Classification Search
CPC ............. G02F 1/136286; G02F 1/1368; G02F 1/13452; G02F 1/13306; G09G 3/3688;
(Continued)

(56) References Cited

U.S. PATENT DOCUMENTS 7,477,224 B2    1/2009   Song et al.
2008/0259016 A1   10/2008   Tanaka et al.
(Continued)

FOREIGN PATENT DOCUMENTS

CN    102749775 A    10/2012
CN    103137089 A    6/2013
(Continued)

OTHER PUBLICATIONS

Office Action dated Dec. 25, 2019 issued in corresponding Chinese Application No. 201810010209.4.

*Primary Examiner* — Yaron Cohen
(74) *Attorney, Agent, or Firm* — Nath, Goldberg & Meyer; Joshua B. Goldberg

(57) ABSTRACT

An array substrate includes plural sub-pixels in plural rows and plural columns; plural data ports; Ndl data lines, each of
(Continued)

the Ndl data lines connecting to a column of sub-pixels, the Ndl data lines being divided into plural groups, each group including N data lines; and a multiplexer including M control lines and plural switching units in one-to-one correspondence with the Ndl data lines, each control line being connected to and controlling $$\frac{Ndl}{M}$$

switching units. All of the N data lines in each group are connected to one data port through N switching units, respectively, the data lines in different groups are connected to different data ports, the N switching units corresponding to each group are controlled by N different control lines, respectively, and at least two of the N data lines in each group are provided with a data line another group therebetween.

20 Claims, 2 Drawing Sheets

(51) Int. Cl.
    *G02F 1/1368*     (2006.01)
    *G09G 3/36*       (2006.01)

(52) U.S. Cl.
    CPC ......... *G09G 3/3614* (2013.01); *G09G 3/3688* (2013.01); *G09G 2300/0452* (2013.01); *G09G 2310/0297* (2013.01)

(58) Field of Classification Search
    CPC .. G09G 3/3614; G09G 3/3607; G09G 3/3648; G09G 2330/021; G09G 2310/0297; G09G 2300/0452; G09G 2300/0426
    See application file for complete search history.

(56) References Cited

U.S. PATENT DOCUMENTS

| 2014/0198135 | A1  | 7/2014 | Eom et al. |
| 2016/0189600 | A1* | 6/2016 | Shin ................ G09G 3/3688 345/209 |

FOREIGN PATENT DOCUMENTS

| CN | 104464601 A | 3/2015 |
| CN | 104483794 A | 4/2015 |
| CN | 105741717 A | 7/2016 |
| CN | 105741735 A | 7/2016 |
| CN | 105954951 A | 9/2016 |
| CN | 107942556 A | 4/2018 |

* cited by examiner

ARRAY SUBSTRATE, LIQUID CRYSTAL DISPLAY PANEL AND DRIVING METHOD THEREOF THAT PREVENT LIQUID CRYSTAL MOLECULES FROM UNDERGOING A POLARIZATION PHENOMENON AND HAVE LOW POWER CONSUMPTION

CROSS REFERENCE TO RELATED APPLICATIONS

This is a National Phase Application filed under 35 U.S.C. 371 as a national stage of PCT/CN2018/120612, filed on Dec. 12, 2018, an application claiming priority to Chinese patent application No. 201810010209.4, filed on Jan. 5, 2018, the entire contents of each of which are incorporated herein by reference.

TECHNICAL FIELD

The present disclosure relates to the field of liquid crystal display technology, and particularly relates to an array substrate (e.g., an array substrate for a liquid crystal display device), a liquid crystal display panel and a driving method for the liquid crystal display panel.

BACKGROUND

A liquid crystal display panel may include an array substrate and a data driver integrated circuit (Data Driver IC) that may also be referred to as a data driver chip, and the data driver chip may provide data signals to respective columns of pixels or respective columns of sub-pixels of the array substrate. To reduce the number of ports of the data driver chip used for the liquid crystal display panel, a multiplexer may be employed. In this case, it is desirable to prevent liquid crystal molecules from undergoing a polarization phenomenon and to reduce power consumption of the liquid crystal display panel.

SUMMARY

Embodiments of the present disclosure provide an array substrate, a liquid crystal display panel and a driving method thereof.

Some embodiments of the present disclosure provide an array substrate, including:

a plurality of sub-pixels in a plurality of rows and a plurality of columns;

a plurality of data ports;

Ndl data lines, each of the Ndl data lines connecting to a column of sub-pixels, the Ndl data lines being divided into a plurality of groups, each group including N data lines, where N is greater than or equal to 2; and a multiplexer including M control lines and a plurality of switching units in one-to-one correspondence with the Ndl data lines, each control line being connected to and controlling $$\frac{Ndl}{M}$$

switching units;

wherein all of the N data lines in each group of data lines are connected to one of the plurality of data ports through N switching units of the multiplexer, respectively, the data lines in different groups are connected to different data ports, the N switching units corresponding to each group of data lines are controlled by N different control lines, respectively, and at least two of the N data lines in each group of data lines are provided with a data line in another group therebetween.

In some embodiments, M is greater than N.

In some embodiments, M is 4, and N is 3.

In some embodiments, Ndl is equal to 24, every eight groups of data lines form a set of data lines, all of 24 data lines in the set of data lines are arranged adjacent to each other, and are referred to as 1st to 24th data lines from one side to other side of the 24 data lines sequentially, and the 24 data lines are connected to eight data ports including first to eighth data ports in a direction from the one side to the other side, respectively;

the first data port is connected to the 1st data line, the 2nd data line and the 4th data line;

the second data port is connected to the 3rd data line, the 5th data line and the 6th data line;

the third data port is connected to the 7th data line, the 9th data line and the 10th data line;

the fourth data port is connected to the 8th data line, the 11th data line and the 13th data line;

the fifth data port is connected to the 12th data line, the 15th data line and the 17th data line;

the sixth data port is connected to the 14th data line, the 16th data line and the 19th data line;

the seventh data port is connected to the 18th data line, the 20th data line and the 23rd data line; and the eighth data port is connected to the 21st data line, the 22nd data line and the 24th data line.

In some embodiments, four control lines are referred to as first to fourth control lines in a direction from the plurality of sub-pixels to the plurality of data ports;

the first control line is connected to the switching units corresponding to the 1st data line, the 5th data line, the 9th data line, the 13th data line, the 17th data line and the 21st data line, respectively;

the second control line is connected to the switching units corresponding to the 2nd data line, the 6th data line, the 10th data line, the 14th data line, the 18th data line and the 22nd data line, respectively;

the third control line is connected to the switching units corresponding to the 3rd data line, the 7th data line, the 11th data line, the 15th data line, the 19th data line and the 23rd data line, respectively; and the fourth control line is connected to the switching units corresponding to the 4th data line, the 8th data line, the 12th data line, the 16th data line, the 20th data line and the 24th data line, respectively.

In some embodiments, the sub-pixels in a same column display a same color, and any two adjacent columns of sub-pixels display different colors.

In some embodiments, the sub-pixels in the columns corresponding to $$\frac{Ndl}{M}$$

switching units connected to any one of the M control lines display a same color.

In some embodiments, the plurality of sub-pixels display 4 different colors, respectively, and four adjacent sub-pixels of different colors in a same row form one pixel unit.

In some embodiments, each of the switching units is a transistor; and the transistor includes a first electrode connected to a corresponding data line, a second electrode connected to a corresponding data port, and a gate connected to a corresponding control line.

In some embodiments, the transistor is an N-type transistor; and the first electrode of the transistor is a source electrode, and the second electrode of the transistor is a drain electrode.

Some embodiments of the present disclosure provide a liquid crystal display panel, including:

the array substrate according to any one of the embodiments as described above; and a data driver chip, including a plurality of ports in one-to-one correspondence with both the plurality of data ports and the M control lines, wherein each of the ports corresponding to the plurality of data ports is connected to a corresponding data port, and outputs a data signal of which a polarity is unchanged during one frame, and the ports corresponding to the M control lines are connected to the M control lines, respectively.

In some embodiments, during the one frame, data signals provided by any adjacent two of the ports corresponding to the plurality of data ports have polarities opposite to each other.

In some embodiments, during the one frame, data signals provided by the ports connected to the first data port, the third data port, the fifth data port and the seventh data port have a first polarity, data signals provided by the ports connected to the second data port, the fourth data port, the sixth data port and the eighth data port have a second polarity, and the second polarity is opposite to the first polarity.

Some embodiments of the present disclosure provide a method for driving a liquid crystal display panel, wherein the liquid crystal display panel includes the array substrate according to any one of the embodiments as described above, and the method includes:

sequentially providing a turn-on signal for turning on corresponding switching units to the M control lines; and providing data signals to the plurality of data ports for driving the sub-pixels to display information, while each of the M control lines receives the turn-on signal;

wherein during one frame, the data signal provided to any one of the data ports has an unchanged polarity, and the data signals provided to any adjacent two of the data ports have polarities opposite to each other.

In some embodiments, during one frame, the data signals provided to the first data port, the third data port, the fifth data port and the seventh data port have a first polarity, the data signals provided to the second data port, the fourth data port, the sixth data port and the eighth data port have a second polarity, and the second polarity is opposite to the first polarity.

In some embodiments, during any two adjacent frames, the data signals provided to any one of the data ports have polarities opposite to each other.

DETAILED DESCRIPTION

To enable one of ordinary skill in the art to better understand the technical solutions of the present disclosure, the present disclosure will be further described in detail below with reference to the accompanying drawings and exemplary embodiments.

Embodiments of the present disclosure provide an array substrate, a liquid crystal display panel and a driving method thereof, so as to at least prevent liquid crystal molecules from undergoing a polarization phenomenon and/or reduce power consumption.

Figure 1:
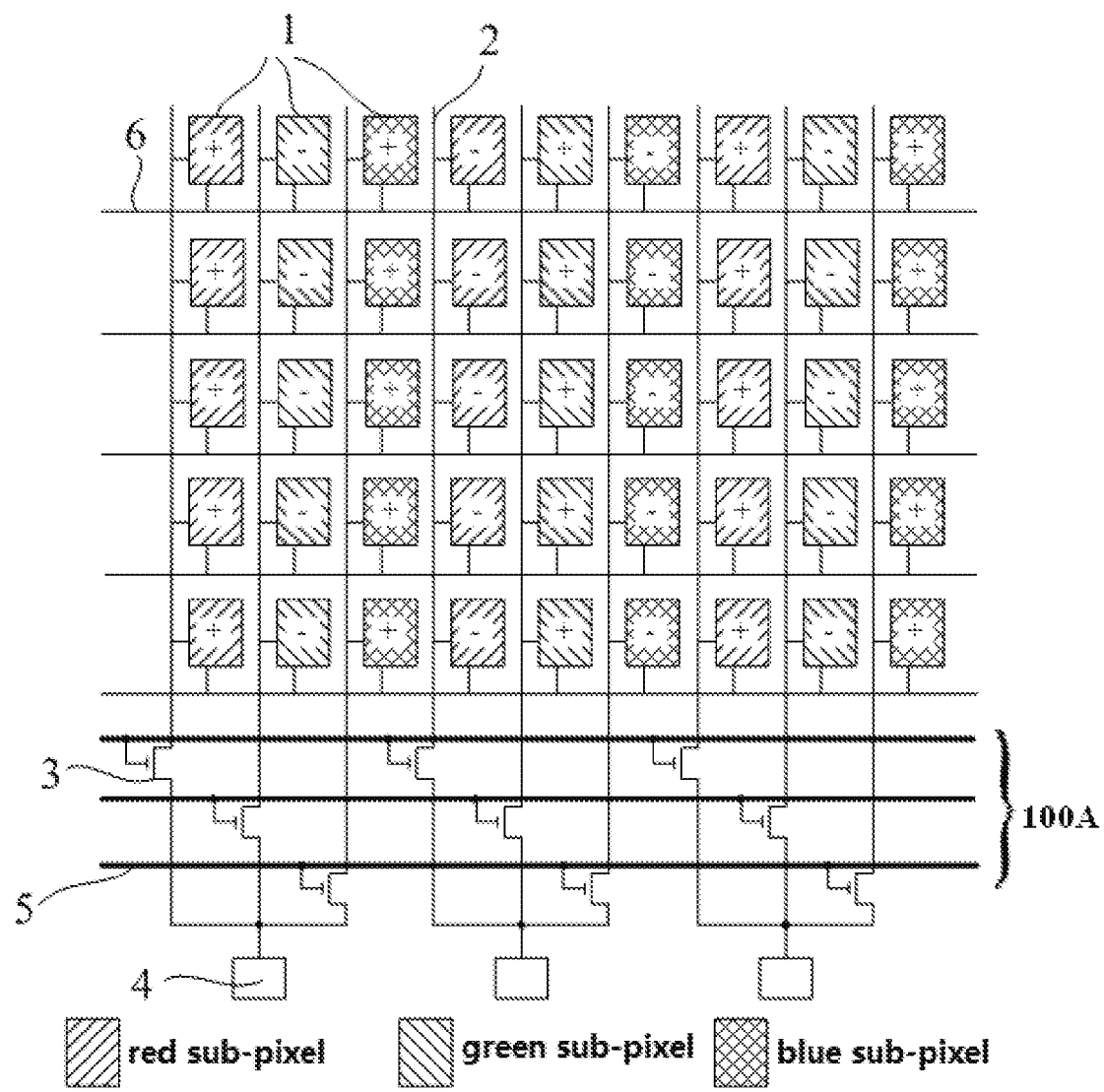
FIG. 1 is a schematic diagram showing a structure of an array substrate according to an embodiment of the present disclosure.
Figure 2:
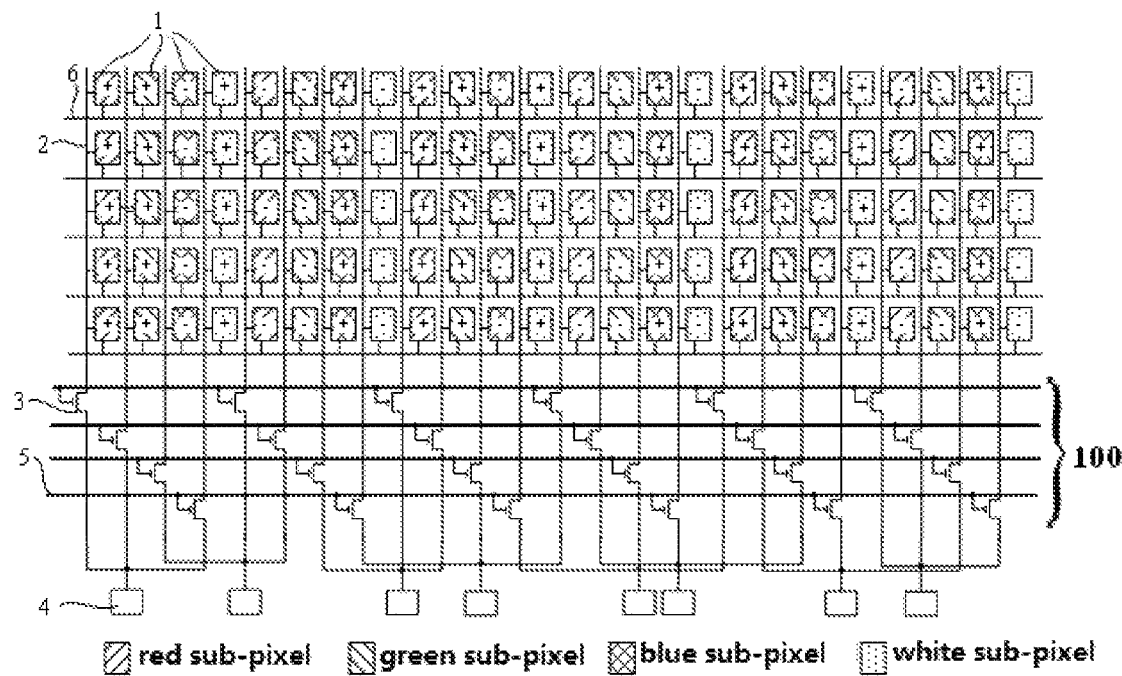
FIG. 2 is a schematic diagram showing a structure of another array substrate according to an embodiment of the present disclosure.
Figure 3:
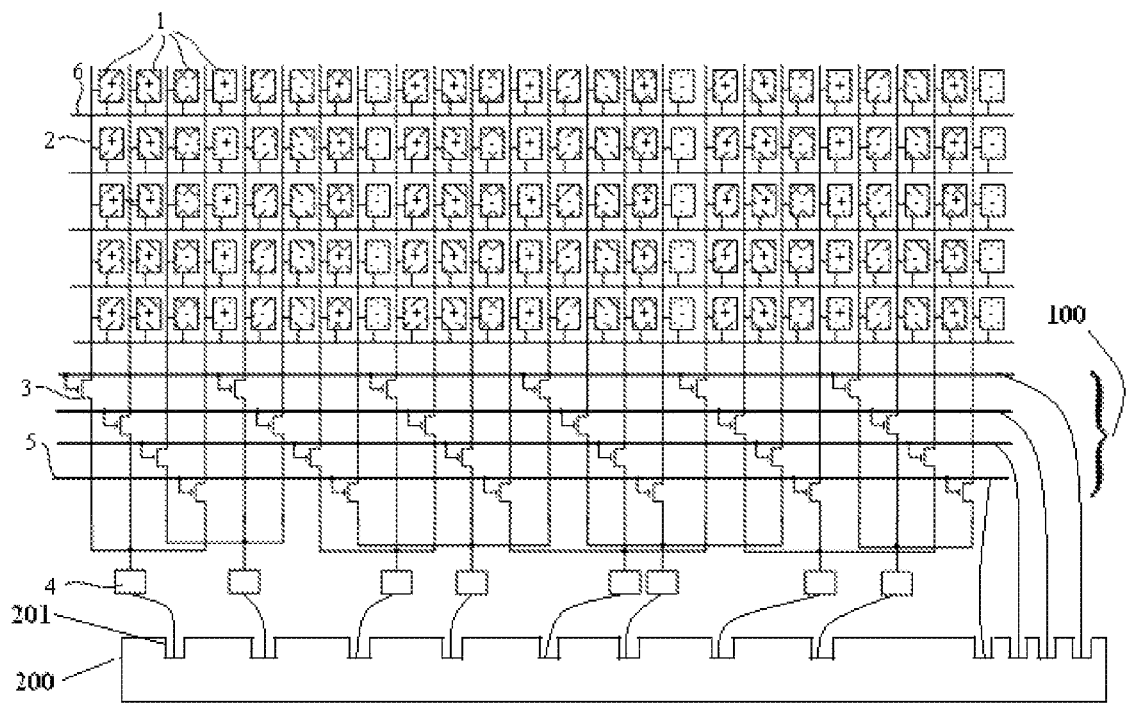
FIG. 3 is a schematic diagram showing a structure of a display panel according to an embodiment of the present disclosure.

FIG. 1 is a schematic diagram showing a structure of an array substrate according to an embodiment of the present disclosure, FIG. 2 is a schematic diagram showing a structure of another array substrate according to an embodiment of the present disclosure, and FIG. 3 is a schematic diagram showing a structure of a display panel according to an embodiment of the present disclosure.

The array substrate shown in FIG. 1 may include a plurality of sub-pixels 1 arranged in a plurality of rows and a plurality of columns; a plurality of (e.g., 3) data ports 4; Ndl (e.g., 9) data lines 2, each of the data line 2 connecting to one column of sub-pixels 1, the Ndl data lines 2 being divided into a plurality of (e.g., 3) groups, each group including N (e.g., 3) data lines 2, where N is greater than or equal to 2; and a multiplexer 100A including a plurality of switching units 3 in one-to-one correspondence with the Ndl data lines 2, and including M (e.g., 3) control lines, each of the control lines being connected to and controlling $$\frac{Ndl}{M}$$

(e.g., 9/3=3) switching units. In the array substrate, all N data lines 2 in each group of data lines 2 are connected to one of the plurality of data ports 4 through N switching units 3 of the multiplexer 100A, respectively, the data lines 2 in different groups are connected to different data ports 4, the N switching units corresponding to each group of data lines 2 being controlled by N different control lines 5, respectively, and at least two of the N data lines 2 in each group of data lines 2 being provided with a data line 2 in another group therebetween.

In other words, FIG. 1 shows an array substrate of a display panel (e.g., a liquid crystal display panel) employing a multiplexer technology. In the array substrate, a plurality of pixel units are arranged in each row, and each of the pixel units includes three adjacent red (R), green (G) and blue (B) sub-pixels 1. Each column of sub-pixels 1 is connected to one data line 2. Three data lines 2 connected to three sub-pixels 1 of one pixel unit are connected to one data port 4 through three switching units (e.g., transistors) 3, respectively, and the data ports 4 may be connected to ports (which may be similar to the ports 201 shown in FIG. 3) of a data driver chip (which may be similar to the data driver chip 200 shown in FIG. 3). In the array substrate, the plurality of transistors 3 corresponding to the sub-pixels 1 of a same color in different pixel units are controlled by one control line 5, so the multiplexer may include three control lines 5. That is, in the present embodiment, the multiplexer may include 9 transistors and three control lines 5. The data driver chip may include a plurality of ports in one-to-one correspondence with both the plurality of data ports 4 and the M control lines 5. Each of the ports corresponding to the plurality of data ports is connected to the corresponding data port to provide data signals to the corresponding data port, and the ports corresponding to the M control lines are connected to the M control lines, respectively, to provide control signals to the M control lines. Each of the control signals may be a turn-on signal that turns on corresponding transistors 3 or a turn-off signal that turns off the corresponding transistors 3. In the case where each of the transistors 3 is an N-type transistor, the turn-on signal is a high level signal, and the turn-off signal is a low level signal. In the case where each of the transistors 3 is a P-type transistor, the turn-on signal is a low level signal, and the turn-off signal is a high level signal. Thus, when a signal on one gate line 6 is a turn-on signal (i.e., a signal for turning on transistors connected to the gate line 6), the multiplexer may provide turn-on signals to the three control lines 5 in turn, to enable data signals at each data port 4 to enter into the three sub-pixels 1 of one pixel unit sequentially, thereby implementing a multiplexing manner of driving the three data lines 2 with each port of the data driver chip (i.e., three driven by one).

As described above, in the liquid crystal display panel, in order to prevent the liquid crystal molecules from undergoing the polarization phenomenon, a polarity (e.g., a positive polarity or a negative polarity) of the data signals provided to the sub-pixels 1 may be inverted, i.e., the polarity of the data signals provided to the sub-pixels 1 should be changed such that a direction of a driving electric field in the sub-pixels 1 is changed. As shown in FIG. 1, one inversion implementation may be a column inversion, i.e. the polarities of the data signals for at least some adjacent columns of sub-pixels 1 should be opposite to each other (as shown by the symbols "+" and "−" in the drawings).

In the embodiment of FIG. 1, when the signal on a gate line 6 is a turn-on signal, each data port 4 (and thus the corresponding port of the data driver chip) may sequentially provide data signals to adjacent sub-pixels 1 in one row. Since these sub-pixels 1 are located in different columns, the polarities of the data signals should be changed accordingly. That is, each port of the data driver chip may output data signals with varying polarities during one frame. In this case, a level variation range of the data driver chip may be large, and thus the power consumption of the data driver chip or a display panel may be high.

As shown in FIG. 2, an embodiment of the present disclosure provides another array substrate, for example, an array substrate for a liquid crystal display device. The array substrate may include a plurality of sub-pixels 1 arranged in an array (e.g., a plurality of rows and a plurality of columns); and a plurality of data ports 4.

The array substrate may further include Ndl (e.g., 24) data lines 2, each data line 2 connecting to one column of sub-pixels 1, and the Ndl data lines 2 being divided into a plurality of groups, each group including N (e.g., 3) data lines 2, where N is greater than or equal to 2; and a multiplexer 100 including a plurality of switching units (e.g., transistors) 3 in one-to-one correspondence with the Ndl data lines 2 and including M (e.g., 4) control lines 5, each control line 5 being connected to and controlling $$\frac{Ndl}{M}$$

(e.g., 24/4=6) the switching units 3. In the array substrate, all N data lines in each group of data lines 2 are connected to one of the plurality of data ports 4 through N switching units 3 of the multiplexer 100, the data lines 2 in different groups are connected to different data ports 4, the N switching units 3 corresponding to each group of data lines 2 are controlled by N different control lines 5, respectively, and at least two of the N data lines 2 in each group of data lines 2 are provided with a data line 2 in other groups therebetween.

The array substrate according to the present embodiment includes a plurality of gate lines 6 arranged along a row direction and a plurality of data lines 2 arranged along a column direction, and regions formed by the crossing of the gate lines 6 and the data lines 2 define the sub-pixels 1 for displaying. Each of the data lines 2 is connected to and controls one column of sub-pixels 1. For example, the data lines 2 may be divided into a plurality of (e.g., 8) groups, and N (being at least 2, and being 3 in FIG. 2) data lines 2 in each group of data lines 2 are connected to one data port 4 through N switching units 3 of the multiplexer 100, the data port 4 may be connected to a corresponding port 201 of the data driver chip 200 shown in FIG. 3, for example. The switching units 3 are controlled by M control lines 5, respectively, and all N data lines 2 in a group of data lines 2 are controlled by different control lines 5, respectively. For example, the value M may be greater than or equal to the value N.

Further, in the array substrate according to the present embodiment, at least two of all the N data lines 2 in each group of data lines 2 are provided with a data line 2 in other groups therebetween.

As shown in FIG. 2, unlike the array substrate shown in FIG. 1, in the array substrate of the present embodiment, not all of the data lines 2 in a same group (i.e., a group of data lines that are connected to a same data port 4) are disposed adjacent to each other, but the data lines 2 in the same group are provided with at least one data line 2 in another group (i.e., a group of data lines that are connected to another data port 4) therebetween.

In other words, in the array substrate according to the present embodiment, the plurality of columns of sub-pixels 1 controlled by one data port 4 are not arranged adjacent to each other, but are spaced apart from each other by a column of sub-pixels 1 controlled by another data port 4. That is, the columns of sub-pixels 1 controlled by one data port 4 are provided with at least one column of sub-pixels 1 controlled by another data port 4 therebetween. In this way, in a case where the polarity of a data signal output by each port of the data driver chip is not changed, the polarities of the data signals of at least some of adjacent columns of sub-pixels 1 may be different as long as the polarities of the data signals output by different ports are different, thereby realizing the column inversion (i.e., the polarities of the data signals of the sub-pixels 1 in two adjacent columns are opposite to each other). Thus, the polarization phenomenon of liquid crystal molecules is avoided. Meanwhile, the polarity of the data signal output by each port of the data driver chip is unchanged. As a result, a level range output by each port is small, and the power consumption of the data driver chip is also low.

In an embodiment, each of the switching units 3 may be a transistor. Each transistor includes a first electrode connected to a corresponding data line 2, a second electrode connected to a corresponding data port 4, and a gate connected to a corresponding control line 5. In an embodiment, each of the transistors may be an N-type transistor. In this case, the first electrode of each transistor may be a source, and the second electrode may be a drain. However, the present disclosure is not limited thereto. For example, each of the transistors may be a P-type transistor. In this case, the first electrode of each transistor may be a drain, and the second electrode may be a source.

As shown in FIG. 2, a transistor may be used as each of the above switching units 3. In this case, the first and second electrodes of the transistor may be connected to the corresponding data line 2 and the corresponding data port 4, respectively, and the gate of the transistor may be connected to the corresponding control line 5 so as to be controlled by the corresponding control line 5.

In an embodiment, the sub-pixels 1 in a same column may display a same color (e.g., one of the red R, the green G, the blue B and the white W), and any two adjacent columns of sub-pixels 1 display different colors. Further, the sub-pixels 1 in the plurality of columns corresponding to the plurality of switching units 3 connected to any one of the control lines 5 may display a same color.

That is, when the plurality of sub-pixels 1 display a plurality of different colors, respectively, the sub-pixels 1 in a same column may display a same color, and two adjacent columns of sub-pixels 1 may display different colors. Thus, the sub-pixels 1 controlled by each data line 2 displays a same color. Further, the sub-pixels 1 in the columns corresponding to the switching units 3 connected to each control line 5 may display a same color. That is, each control line 5 may control the columns of sub-pixels 1 that display a same color. Thus, a screen of a single color is to be displayed, a turn-on signal may be provided to only one control line 5 corresponding to the color, which may further reduce the power consumption.

As described above, in an embodiment, the value M is greater than the value N. In an embodiment, the value M is 4 and the value N is 3.

As shown in FIG. 2, the number M of the control lines 5 may be greater than the number N of the data lines 2 corresponding to each data port 4. For example, each data port 4 may corresponds to three data lines 2, and the number of the control lines 5 may be 4. Therefore, the data lines 2 in different groups may be controlled by different control lines 5, thereby achieving a more efficient multiplexing manner than the N(three)-driven-by-one multiplexing manner achieved by the embodiment of FIG. 1.

For example, compared with the embodiment of FIG. 1, the embodiment of FIG. 2 has at least the following advantages. The data driver chip for a specific liquid crystal display panel (e.g., a liquid crystal display panel in RGB mode) according to the embodiment of FIG. 1 may be applied to an array substrate (e.g., the array substrate in RGBW mode shown in FIG. 2) having more sub-pixels 1 and a corresponding liquid crystal display panel (e.g., a liquid crystal display panel in RGBW mode shown in FIG. 3), by adding control lines 5 and the corresponding number of switching units (e.g., transistors) 3 to the multiplexer 100A to change the structure of the multiplexer 100A of the array substrate.

In an embodiment, the value Ndl is equal to 24, and 8 subsets (i.e., groups) of data lines 2 (24 data lines 2 in total) form a set of data lines 2. All of the 24 data lines 2 in the set of data lines 2 are disposed adjacent to each other, and are sequentially referred to as 1st to 24th data lines from one side to the other side (e.g., from the left side to the right side of FIG. 2 or 3). The 24 data lines are respectively connected to eight data ports 4, including first to eighth data ports 4 that are arranged in the direction from the one side to the other side. The first data port is connected to the 1st data line, the 2nd data line and the 4th data line. The second data port is connected to the 3rd data line, the 5th data line and the 6th data line. The third data port is connected to the 7th data line, the 9th data line and the 10th data line. The fourth data port is connected to the 8th data line, the 11th data line and the 13th data line. The fifth data port is connected to the 12th data line, the 15th data line and the 17th data line. The sixth data port is connected to the 14th data line, the 16th data line and the 19th data line. The seventh data port is connected to the 18th data line, the 20th data line and the 23rd data line. The eighth data port is connected to the 21st data line, the 22nd data line and the 24th data line.

In an embodiment, the 4 control lines are a first control line 5 to a fourth control line 5 in the direction from the plurality of sub-pixels 1 to the plurality of data ports 4, respectively. The first control line 5 may be connected to the switching units 3 respectively corresponding to the 1st data line, the 5th data line, the 9th data line, the 13th data line, the 17th data line and the 21st data line. The second control line may be connected to the switching units 3 respectively corresponding to the 2nd data line, the 6th data line, the 10th data line, the 14th data line, the 18th data line and the 22nd data line. The third control line may be connected to the switching units 3 respectively corresponding to the 3rd data line, the 7th data line, the 11th data line, the 15th data line, the 19th data line and the 23rd data line. The fourth control line may be connected to the switching units 3 respectively corresponding to the 4th data line, the 8th data line, the 12th data line, the 16th data line, the 20th data line, and the 24th data line.

That is, when M is 4 and N is 3, every 24 data lines 2 arranged in series may form one set, and the control lines 5 may control the respective switching units 3 in the set of data lines 2 in the above manner. A plurality of sets of data lines 2 may be repeatedly arranged (for example, in the horizontal direction of FIG. 2 or 3) to form an entire array substrate. For example, each of the sets may include 8 data ports 4 and 24 data lines 2, which operate under the control of four control lines 5. In this way, a twenty four-driven-by-eight multiplexing manner is realized. In the above manner, the data lines 2 connected to each data port 4 are arranged relatively uniformly, which is advantageous to implementing the column inversion.

In an embodiment, the sub-pixels 1 in a same column display a same color, and any two adjacent columns of sub-pixels 1 display different colors. In an embodiment, the sub-pixels 1 in a plurality of (e.g., 6) columns corresponding to a plurality of (e.g., 6) switching units 3 connected to any one of the control lines 5 display a same color. In an embodiment, the plurality of sub-pixels 1 display four different colors (e.g., red R, green G, blue B, and white W), and 4 adjacent sub-pixels 1 of different colors in a same row form one pixel unit. As shown in FIGS. 2 and 3, a sub-pixel displaying red R is referred to as a red sub-pixel, a sub-pixel displaying green G is referred to as a green sub-pixel, a sub-pixel displaying blue B is referred to as a blue sub-pixel, and a sub-pixel displaying white W is referred to as a white sub-pixel.

That is, in the case of the twenty four-driven-by-eight multiplexing manner, the sub-pixels 1 in a same column may display a same color, and the sub-pixels 1 in the columns controlled by each control line 5 may display a same color. In this case, the array substrate may be of 4-color mode (e.g., RGBW mode, RGBY mode in which Y represents yellow, or the like). Thus, any two adjacent columns of sub-pixels 1 of a same color may be spaced apart from each other by 3 columns and connected to a same control line 5.

In this way, the data driver chip of the liquid crystal display panel of RGB mode according to the embodiment of FIG. 1 may be applied to the liquid crystal display panel of RGBW mode (or RGBY mode or the like) by adding one control line 5 and the corresponding number of switching units 3 to the array substrate as shown in FIG. 1.

Further, according to the above description, for one column of sub-pixels 1 of any one color, its adjacent column of sub-pixels 1 (of the same color as that of the one column of sub-pixels 1) may have an opposite polarity of data signal to the polarity of data signal of the one column of sub-pixels 1, as long as the polarities of the data signals output from adjacent data ports 4 are opposite to each other. In other words, the polarities of the data signals provided to any two adjacent columns of sub-pixels 1 of a same color are opposite to each other. In this way, the optimal column inversion may be achieved when displaying a screen of any one of the above four colors.

An embodiment of the present disclosure provides a display panel (e.g., a liquid crystal display panel). As shown in FIG. 3, the display panel may include the array substrate as shown in FIG. 2; and the data driver chip 200 including a plurality of ports 201 in one-to-one correspondence with both the plurality of data ports 4 and the M control lines 5, wherein each port 201 of the ports 201 corresponding to the plurality of data ports 4 is connected to one data port 4 so as to provide a data signal to the data port 4, the polarity of the data signal provided from each port 201 of the data driver chip 200 to the corresponding data port 4 is unchanged during one frame, and the ports 201 corresponding to the M control lines 5 are respectively connected to the M control lines so as to respectively provide control signals to the M control lines.

In an embodiment, the control signal provided from each port 201 to the corresponding control line 5 may be the turn-on signal to turn on each of the transistors 3 connected to the control line 5 or the turn-off signal to turn off each of the transistors 3 connected to the control line 5. In the case where each transistor 3 is an N-type transistor, the turn-on signal may be a high level signal, and the turn-off signal may be a low level signal. In the case where each transistor 3 is a P-type transistor, the turn-on signal may be a low level signal, and the turn-off signal may be a high level signal.

That is, the array substrate may be combined with another component (such as a color filter substrate) to form a liquid crystal display panel capable of displaying information. The liquid crystal display panel may include the data driver chip 200. Each port 201 of a portion of the plurality of ports 201 of the data driver chip 200 is connected to one data port 4 of the array substrate (e.g., via a flexible wiring board) so as to provide a data signal to the data lines 2 corresponding to the data port 4, and each port 201 in another portion of the plurality of ports 201 of the data driver chip 200 is connected to one control line 5 to provide a control signal to the control line 5, thereby controlling turn-on and turn-off of the switching units (e.g., transistors) 3 connected to the control line 5.

For example, when a signal on one gate line 6 is a turn-on signal (i.e., a signal for causing the sub-pixels 1 connected to the gate line 6 to display information), the data driver chip 200 may input the turn-on signals to the control lines 5 of the multiplexer 100 in turn, to turn on the corresponding switching units 3 in turn, thereby sequentially inputting the data signals, which are provided from each port 201 of the data driver chip 200 to the corresponding data port 4, into the sub-pixels 1 in a same row. Since the liquid crystal display panel includes the array substrate as described above, the polarity of the data signal provided by each port 201 of the data driver chip 200 during one frame may be unchanged, and simultaneously, the polarities of the data signals of the different columns of sub-pixels 1 may be different. In this way, the column inversion is realized (i.e., the polarization phenomenon of liquid crystal molecules is avoided) with the power consumption being reduced.

In an embodiment, during one frame, the data signals provided by any adjacent two of the ports 201 of the data driver chip 200 corresponding to the data ports 4 have polarities opposite to each other.

In an embodiment, as shown in FIGS. 2 and 3, in the array substrate of the twenty four-driven-by-eight multiplexing manner, during one frame, the data signals provided by the ports 201 connected to the first data port 4, the third data port 4, the fifth data port 4 and the seventh data port 4 have a first polarity, the data signals provided by the ports 201 connected to the second data port 4, the fourth data port 4, the sixth data port 4 and the eighth data port 4 have a second polarity, and the second polarity is opposite to the first polarity.

For example, of the first polarity and the second polarity, one is a positive polarity, and the other is a negative polarity.

In an embodiment, the liquid crystal display panel may be any product or component with a display function, such as electronic paper, a mobile phone, a tablet computer, a television, a display, a notebook computer, a digital photo frame, a navigator, or the like.

The liquid crystal display panel according to the present embodiment can prevent liquid crystal molecules from undergoing the polarization phenomenon, and have low power consumption.

An embodiment of the present disclosure provide a method for driving a liquid crystal display panel that may include the array substrate shown in FIG. 2, and the method may include the following steps S1 and S2.

At step S1, the data driver chip 200 sequentially provides turn-on signals to the M control lines 5 for turning on the corresponding switching units 3 connected to the M control lines 5, through the plurality of data ports 4.

At step S2, while each control line 5 of the M control lines 5 receives a corresponding turn-on signal, data signals for driving the sub-pixels 1 to display information are provided from the data driver chip 200 to the plurality of data ports 4.

In an embodiment, in the driving method, the polarity of the data signal provided to any one of the data ports 4 is unchanged during one frame. Further, the data signals provided to any adjacent two of the data ports 4 may have polarities opposite to each other.

Since the liquid crystal display panel includes the array substrate shown in FIG. 2, the polarity of the data signal provided to each data port 4 is unchanged during each frame, thereby realizing the column inversion (i.e., the polarization phenomenon of liquid crystal molecules is avoided) with power consumption being reduced.

In an embodiment, in the array substrate of the twenty four-driven-by-eight multiplexing manner, during one frame, the data signals provided to the first data port 4, the third data port 4, the fifth data port 4, and the seventh data port 4 have a first polarity, and the data signals provided to the second data port 4, the fourth data port 4, the sixth data port 4, and the eighth data port 4 have a second polarity, the second polarity being opposite to the first polarity.

For example, of the first polarity and the second polarity, one is a positive polarity, and the other is a negative polarity.

In the present disclosure, in order to reduce the power consumption more effectively, the polarity of the data signal provided by any port 201 of the data driver chip 200 may be unchanged during any two adjacent frames. Alternatively, in order to prevent the liquid crystal molecules from undergoing the polarization phenomenon, the polarities of the data signals provided from any port 201 of the data driver chip 200 to the corresponding data port 4 may be opposite to each other during any two adjacent frames.

By changing the polarity of the data signal provided by each data port 4 during different frames, the polarities of the data signals of each column of sub-pixels 1 during different frames can be ensured to be opposite to each other, while the column inversion is realized, thereby preventing the liquid crystal molecules from undergoing the polarization phenomenon more effectively.

The method for driving a liquid crystal display panel according to the present embodiment can prevent the liquid crystal molecules of the liquid crystal display panel from undergoing a polarization phenomenon, and meanwhile, the liquid crystal display panel can have low power consumption.

It is to be understood that the above embodiments are merely exemplary embodiments for explaining the principles of the present disclosure, and the present disclosure is not limited thereto. It will be apparent to one of ordinary skill in the art that various changes and modifications can be made thereto without departing from the spirit and essence of the present disclosure, and these changes and modifications also fall within the scope of the present disclosure.

What is claimed is:

1. An array substrate, comprising:
   a plurality of sub-pixels in a plurality of rows and a plurality of columns;
   a plurality of data ports;
   Ndl data lines, each of the Ndl data lines connecting to a column of sub-pixels, the Ndl data lines being divided into a plurality of groups, each group comprising N data lines, where N is greater than or equal to 2; and
   a multiplexer comprising M control lines and a plurality of switching units in one-to-one correspondence with the Ndl data lines, Ndl being greater than M, $$\frac{Ndl}{M}$$

being a positive integer greater than 1, and each control line being connected to and controlling $$\frac{Ndl}{M}$$

switching units;
   wherein all of the N data lines in each group of data lines are connected to one of the plurality of data ports through N switching units of the multiplexer, respectively, the data lines in different groups are connected to different data ports, the N switching units corresponding to each group of data lines are controlled by N different control lines, respectively, and at least two of the N data lines in each group of data lines are provided with a data line in another group therebetween.

2. The array substrate according to claim 1, wherein:
   M is greater than N.

3. The array substrate according to claim 2, wherein:
   M is 4, and N is 3.

4. The array substrate according to claim 3, wherein:
   Ndl is equal to 24, every eight groups of data lines form a set of data lines, all of 24 data lines in the set of data lines are arranged adjacent to each other, and are referred to as 1st to 24th data lines from one side to other side of the 24 data lines sequentially, and the 24 data lines are connected to eight data ports comprising first to eighth data ports in a direction from the one side to the other side, respectively;
   the first data port is connected to the 1st data line, the 2nd data line and the 4th data line;
   the second data port is connected to the 3rd data line, the 5th data line and the 6th data line;
   the third data port is connected to the 7th data line, the 9th data line and the 10th data line;
   the fourth data port is connected to the 8th data line, the 11th data line and the 13th data line;
   the fifth data port is connected to the 12th data line, the 15th data line and the 17th data line;
   the sixth data port is connected to the 14th data line, the 16th data line and the 19th data line;
   the seventh data port is connected to the 18th data line, the 20th data line and the 23rd data line; and
   the eighth data port is connected to the 21st data line, the 22nd data line and the 24th data line.

5. The array substrate according to claim 4, wherein:
   the four control lines are referred to as first to fourth control lines in a direction from the plurality of sub-pixels to the plurality of data ports, respectively;
   the first control line is connected to the switching units corresponding to the 1st data line, the 5th data line, the 9th data line, the 13th data line, the 17th data line and the 21st data line, respectively;
   the second control line is connected to the switching units corresponding to the 2nd data line, the 6th data line, the 10th data line, the 14th data line, the 18th data line and the 22nd data line, respectively;
   the third control line is connected to the switching units corresponding to the 3rd data line, the 7th data line, the 11th data line, the 15th data line, the 19th data line and the 23rd data line, respectively; and
   the fourth control line is connected to the switching units corresponding to the 4th data line, the 8th data line, the 12th data line, the 16th data line, the 20th data line and the 24th data line, respectively.

6. The array substrate according to claim 4, wherein:
   the sub-pixels in a same column display a same color, and any two adjacent columns of sub-pixels display different colors.

7. The array substrate according to claim 4, wherein:
   the sub-pixels in the columns corresponding to $$\frac{Ndl}{M}$$

switching units connected to any one of the M control lines display a same color.

8. The array substrate according to claim 4, wherein:
   the plurality of sub-pixels display 4 different colors, respectively, and four adjacent sub-pixels of different colors in a same row form one pixel unit.

9. The array substrate according to claim 1, wherein:
   the plurality of sub-pixels display 4 different colors, respectively, and four adjacent sub-pixels of different colors in a same row form one pixel unit.

10. The array substrate according to claim 1, wherein:
the sub-pixels in a same column display a same color, and any two adjacent columns of sub-pixels display different colors.

11. The array substrate according to claim 1, wherein:
the sub-pixels in the columns corresponding to $$\frac{Ndl}{M}$$

switching units connected to any one of the M control lines display a same color.

12. The array substrate according to claim 1, wherein:
each of the switching units is a transistor; and
the transistor comprises a first electrode connected to a corresponding data line, a second electrode connected to a corresponding data port, and a gate connected to a corresponding control line.

13. The array substrate according to claim 12, wherein:
the transistor is an N-type transistor; and
the first electrode of the transistor is a source electrode, and the second electrode of the transistor is a drain electrode.

14. A liquid crystal display panel, comprising:
the array substrate according to claim 1; and
a data driver chip, comprising a plurality of ports in one-to-one correspondence with both the plurality of data ports and the M control lines, wherein each of the ports corresponding to the plurality of data ports is connected to a corresponding data port, and outputs a data signal of which a polarity is unchanged during one frame, and the ports corresponding to the M control lines are connected to the M control lines, respectively.

15. The liquid crystal display panel according to claim 14, wherein:
during the one frame, data signals provided by any adjacent two of the ports corresponding to the plurality of data ports have polarities opposite to each other.

16. A liquid crystal display panel, comprising:
the array substrate according to claim 4; and
a data driver chip, comprising a plurality of ports in one-to-one correspondence with both the plurality of data ports and the M control lines, wherein each of the ports corresponding to the plurality of data ports is connected to a corresponding data port, and outputs a data signal of which a polarity is unchanged during one frame, and the ports corresponding to the M control lines are connected to the M control lines, respectively.

17. The liquid crystal display panel according to claim 16, wherein:
during the one frame, data signals provided by the ports connected to the first data port, the third data port, the fifth data port and the seventh data port have a first polarity, data signals provided by the ports connected to the second data port, the fourth data port, the sixth data port and the eighth data port have a second polarity, and the second polarity is opposite to the first polarity.

18. A method for driving a liquid crystal display panel, wherein the liquid crystal display panel comprises the array substrate according to claim 1, and the method comprises:
sequentially providing a turn-on signal for turning on corresponding switching units to the M control lines; and
providing data signals to the plurality of data ports for driving the sub-pixels to display information, while each of the M control lines receives the turn-on signal;
wherein during one frame, the data signal provided to any one of the data ports has an unchanged polarity, and the data signals provided to any adjacent two of the data ports have polarities opposite to each other.

19. A method for driving a liquid crystal display panel, wherein the liquid crystal display panel comprises the array substrate according to claim 4, and the method comprises:
sequentially providing a turn-on signal for turning on corresponding switching units to the M control lines; and
providing data signals to the plurality of data ports for driving the sub-pixels to display information, while each of the M control lines receives the turn-on signal;
wherein during one frame, the data signals provided to the first data port, the third data port, the fifth data port and the seventh data port have a first polarity, the data signals provided to the second data port, the fourth data port, the sixth data port and the eighth data port have a second polarity, and the second polarity is opposite to the first polarity.

20. The method according to claim 18, wherein
during any two adjacent frames, the data signals provided to any one of the data ports have polarities opposite to each other.

\* \* \* \* \*